July 15, 1969     J. J. REICH ET AL     3,456,056

METHOD FOR REPELLING BEES

Filed May 13, 1964

Inventors
JOHN J. REICH
FRANCIS P. REICH

By Anderson, Luedeka, Fitch, Even & Tabin
Atty's 3,456,056
METHOD FOR REPELLING BEES
John J. Reich, 6314 W. Patterson Ave., Chicago, Ill. 60634, and Francis P. Reich, R.R. 2, Freeport, Ill. 61032
Filed May 13, 1964, Ser. No. 367,058
Int. Cl. A01k 59/00; A01n 17/02
U.S. Cl. 424—315                                                       6 Claims

ABSTRACT OF THE DISCLOSURE

A method of removing bees from a beehive by introducing into the beehive an effective amount of a nontoxic organic acid or base having a vapor pressure of about 0.25 to about 1.5 millimeters of mercury at 20° C. and a pK of from about 1 to about 8, or an organic precursor which form an organic acid or base having a pK of from 1 to 8. The organic precursor and the acid or base formed therefrom both have a vapor pressure of not more than 1.5 millimeters of mercury, and either the organic precursor or the acid or base formed therefrom has a pressure of above about 0.25 millimeter of mercury at 20° C.

---

Figure 1:
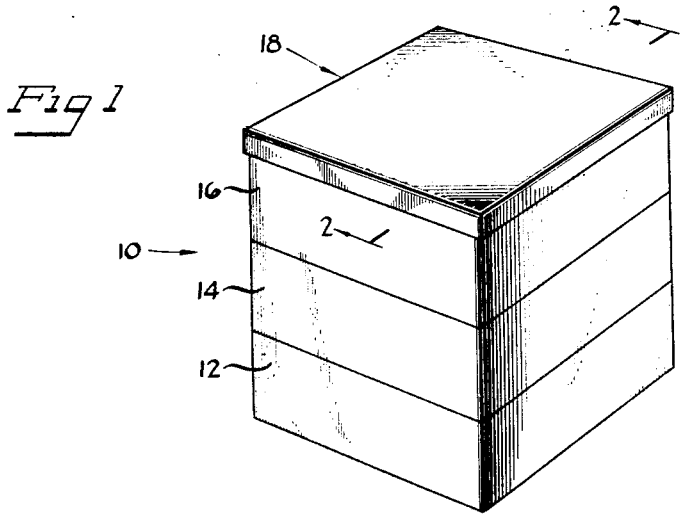

This invention relates generally to bee-keeping, and more specifically relates to a method and apparatus for repelling honey bees.

A bee hive is generally constructed from a series of open ended boxes, called supers, which are stacked on top of one another. Each hive consists of from two to six or more supers which hold tens of thousands of bees. Frames are positioned within the supers upon which the bees build wax combs. Generally, the queen bee lays eggs in the frames in the lowermost supers which are generally referred to as brood supers, and the honey that is collected by the bees is deposited in the uppermost supers of the hive which are generally referred to as honey supers.

Honey is periodically obtained from the hive by removing the upper honey supers and replacing them with empty supers. The honey supers are, however, filled with a large number of bees at the time it is desired to remove them from the hive. It is desirable not to excite or remove these bees from the general area of the hive in order to minimize disturbance of the normal hive activity which may result in a considerable loss of honey.

It is generally known to remove bees from the honey supers of a bee hive by mechanical and chemical means. The bees may be removed from the honey supers mechanically by physically dislodging the bees from the frames within the super after the super has been removed from the hive. This may be accomplished by brushing the bees off the frames with a long handle brush or by blowing the bees from the frames with compressed air. An alternate mechanical method of removing the bees from the honey supers includes inserting bee excluders between the brood supers and the honey supers which permits the bees to leave the honey supers but prevents their entry into the honey supers.

Mechanical methods for the removal of bees from honey supers are generally unsatisfactory, especially for large apiaries, in that they are slow and may cause the bees to become disturbed. Mechanical methods may also excite and anger the bees and cause the beekeeper to receive a large number of stings.

Other more desirable methods of removing bees from honey supers include the use of chemicals which give off vapors which are irritating to bees to drive the bees from the honey supers. Known irritants include phenol, propionic acid, acetic acid and anhydrides thereof. The use of phenol as an irritant includes placing a black board saturated with phenol on top of the hive in direct sun light. The heat of the suns rays absorbed by the board causes the phenol to vaporize and diffuse through the honey supers driving the bees out of these supers. Propionic acid and acetic acid vapors, usually prepared in situ by adding water to an anhydride, are generally introduced into the honey supers using a forced draft, e.g., with bellows or by the use of an aqueous solution thereof.

However, the use of known chemical irritants for the removal of bees from honey supers is not altogether satisfactory.

Phenol is poisonous and may cause personal injury to the beekeeper and/or contamination of the honey as well as being exciting to the bees.

Further, the vapor pressure of known irritants are such that the use of the chemical irritants is highly irratic and is dependent upon the weather conditions and temperature at the time of use. Phenol to be effective can be vaporized and diffused into the honey supers only on warm sunny days in direct sunlight and then requires a black painted board which is heated by the sun to temperatures over 130° F. Phenol also disturbs and excites bees which may result in reduced honey gathering and stinging of the beekeeper.

Propionic acid fumes are non poisonous but generally require the use of an elaborate bellows system and close control to effectively force the propionic acid fumes into the hive without trapping the bees in the irritant fumes.

It is a principal object of the invention to provide a method and apparatus for repelling bees.

Another object is to provide a harmless method and apparatus for quickly and efficiently removing bees from a bee hive super with a minimum of time and effort.

A further object is to provide a method and apparatus for removing bees from a bee hive super which is simple and dependable and which works well with hives that have a large amount of burr comb, uncapped honey or brood in the honey supers.

Yet another object is to provide an economical method and apparatus for removing bees from a bee hive super which does not disturb the bee colony and which does not cause the bees to become excited or angered.

Figure 2:
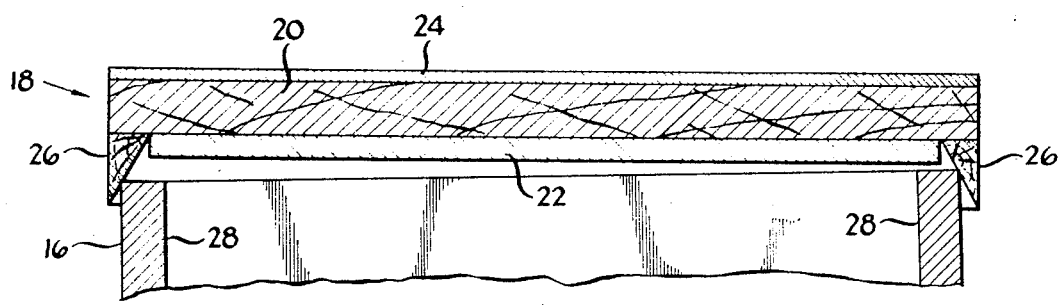

Other objects and advantages of the present invention will become apparent from the following detailed description and from the accompanying drawing of which:

FIGURE 1 is a perspective view of a bee hive which includes a hive cover constructed in accordance with an embodiment of the present invention; and FIGURE 2 is a partial fragmentary cross-sectional view taken along line 2—2 of FIGURE 1.

Very generally, the present invention relates to a method of repelling bees which comprises introducing irritating vapors of nontoxic organic acids and bases having particular physical properties into the region of the bees. More specifically, the invention relates to a method for removing bees from bee hive supers which comprises introducing into the hive irritating vapors of nontoxic organic acids and bases having a pK between 1 and 8 and which have been obtained from organic compounds having a particular vapor pressure, and to a hive cover for use in introducing the irritating vapors into the hive.

There are a large number of nontoxic organic acids and bases whose vapors have been found to be irritating to bees. Generally, the vapors of any organic acid or base which has a pK of from 1 to 8 have been found to be irritating to bees. As used herein, the "pK" is defined as the negative logarithm of the dissociation constant of the respective acid or base at 25° C.

It is not altogether clear why the vapors of organic acids and bases which have a pK of 1 to 8 are irritating to bees. It is not believed that the odor of the irritant compound is the irritating factor, and it is postulated that it is the contact of the irritating vapors with the moist membranes of the bees, e.g., the eyes, which provides the irritating factor. In any event, the results obtained are reproducible and provide for the efficient and rapid removal of bees from a bee hive super.

However, it has been discovered that within the large group of organic acids and bases which have a pK value within the described range, only a few of the acids and bases are desirable for removing bees from the honey supers of a bee hive. In this connection, it has been determined that those organic acids and bases which have a vapor pressure within the narrow range of from about 0.25 to about 1.5 millimeters of mercury at 20° C. are preferred. Bees are cold blooded, and accordingly, the ability of bees to move about is dependent upon the temperature of their surroundings. The rate of diffusion and vapor pressure of the irritating vapors into the supper is therefore desirably correlated to the ability of the bees to move about at a particular temperature. The correlation of the vapor pressure of the irritant compound and the ability of the bees to move about is important since if the irritating vapors diffuse into the super at a rate greater than the rate at which the bees are able to withdraw from the super, the bees will become engulfed or surrounded by the irritating vapors. If the bees are engulfed by the irritating vapors, they lose their sense of direction and are not able to find their way out of the super. Thus, the use of an irritant compound which causes a too rapid diffusion of irritating vapors throughout the super does not cause the bees to be removed from the super regardless of the length of time the irritant vapors are allowed to diffuse into the super. Accordingly, when the super is removed from the bee hive it will contain a large number of bees which may be highly disturbed. If the irritating vapors diffuse into the super at too slow a rate, the removal of the bees from the super will take an inordinate length of time.

However, if the irritant compound has a vapor pressure which is correlated to the ability of the bees to move about the bees will be able to withdraw from the super before they are engulfed by the irritating vapors, thus providing for the rapid and orderly removal of the bees from the super. It has been discovered that the compound from which the irritating vapors are obtained should have a vapor pressure at 20° C. of between about 0.25 and about 1.5 millimeters of mercury. An irritant compound having a vapor pressure within this range has been found to provide irritating vapors which diffuse into the super at a rate which is closely correlated to the rate at which the bees are able to withdraw from the super. Further, it has been discovered that irritant compounds having a vapor pressure within the indicated range perform satisfactorily over the entire range of temperatures at which honey is normally collected, e.g., 60° F. to 100° F.

Organic compounds which may be utilized as irritant compounds within the scope of the present invention generally fall into three categories. First, there are those organic acids and bases which have a vapor pressure and a pK within the desired range. Examples of such organic acids and bases are: pyruvic acid, n-butyric acid, isobutyric acid, trimethyl acetic acid, neopentanoic acid, valeric acid, isovaleric acid, methacrylic acid, cis-crotonic acid, benzyl amine, n-benzyl methylamine and triisobutyl amine.

A second class of irritant compounds are organic precursors which have a vapor pressure of less than 0.25 millimeter of mercury at 20° C., but which chemically react or convert in the liquid phase to form irritant compounds which have the desired vapor pressure and which provide irritating vapors of an organic acid or base having a pK of from about 1 to about 8. Examples of this class of compounds include anhydrides, e.g., butyric anhydride and valeric anhydride, which, in the presence of the moisture normally found in the atmosphere hydrolyze to the corresponding acid, and trans-crotonic acid which undergoes a cis-trans conversion in the liquid phase to form cis-crotonic acid.

A third class of irritant compounds are organic precursors which have a vapor pressure within the desired range and which react in the vapor phase with air to form an acid or a base which has a pK and a vapor pressure within the indicated range. Examples of compounds of this type are: furfural, salicylaldehyde, azelaldehyde, benzoyl chloride, n-caproyl chloride, iso butyric anhydride.

In any event, it has been determined that neither the acid or base nor the precursor should have a vapor pressure above about 1.5 millimeters of mercury at 20° C. Thus, an irritant compound within the scope of the present invention is an organic compound selected from the group consisting of organic acids and bases having a vapor pressure at 20° C. of about 0.25 to about 1.5 millimeters of mercury, and organic precursors which react to form organic acids and bases having a pK of from 1 to 8, said organic precursors and the acids and bases formed therefrom having a vapor pressure of not more than about 1.5 millimeters of mercury at 20° C., and at least one of said organic precursors and the acids and bases formed therefrom having a vapor pressure of above about 0.25 millimeter of mercury at 20° C.

Referring now to the drawing, there is shown in FIGURE 1 a bee hive 10 which includes a brood super 12, and intermediate super 14 and a honey super 16. When the honey super 16 becomes filled with honey, the normal hive cover (not shown) is removed from the hive and a hive cover 18 constructed in accordance with the present invention is placed over the honey super 16.

As seen in FIGURE 2, a preferred embodiment of the cover 18 includes a rigid, body member 20 which is adapted to overlie the open end of the upper super 16 when positioned on the hive. The body 20 may be constructed from wood, absorbent paperboard or any other material which has the required strength characteristics. Preferably, an absorbent pad 22, such as paperboard, fiberboard, cloth or plastic foam, is adhesively or otherwise affixed to the under surface of the body 20 for receiving the irritant compound. The irritant compound is absorbed within the absorbent pad 22 and slowly vaporized therefrom to drive the bees from the super. It is also contemplated, in some instances, to construct the cover 18 without an absorbent pad 22, in which case the irritant compound may be applied directly to the undersurface of the body member 20, which may or may not be constructed from an absorbent material.

The cover 18 desirably, but not necessarily, has an upper reflective surface 24, which may be a sheet of aluminum foil or other similar reflective sheet material. The reflective surface 24 reflects the sun rays and prevents the absorbent sheet 22 from becoming overheated, thereby preventing a too rapid vaporization of the irritant compound.

The cover 18 is desirably provided with a depending rim 26 for supporting the cover on the hive so that the absorbent pad 22 is spaced above the upper surface of the super 16. It is important to construct the cover in this manner to insure that the liquid irritant compound absorbed within the pad 22 will not directly contact and thereby contaminate the honey contained within the upper portions of the super 16.

Figure 3:
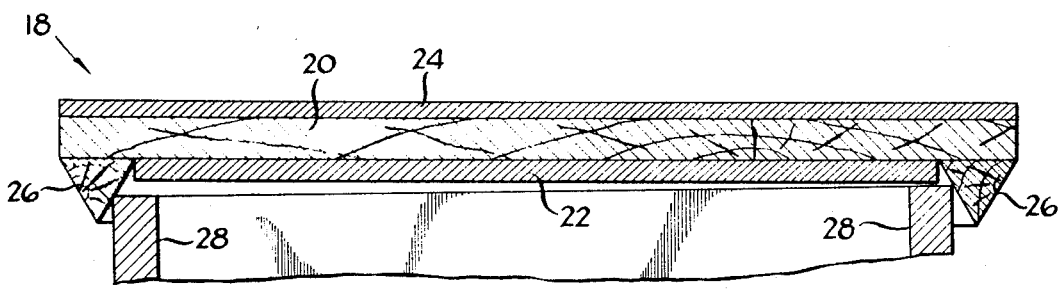

As seen in FIGURE 2, the rim 26 is preferably triangularly shaped and is attached to the body 20 in a manner so that the cover 18 is supported on the hive by engagement of an inclined edge of the rim 26 with the extremities of the sidewalls 28 of the super 16. FIGURE 3 illustrates an alternate embodiment of the rim 26. The use of a rim having an inclined edge for supporting the cover on the hive insures that a snug fit between the cover and hive will be achieved without requiring careful alignment of the cover and hive. Further, as illustrated in FIGURES 2 and 3, the use of a rim having an inclined edge allows the cover to be used to cover supers which are slightly oversized or undersized, or which have become warped and which have wax and propolis on the top ledge of the sidewalls 28.

When used to repel bees from the upper supers of a bee hive, the absorbent pad of the cover 18 is sprinkled with a small amount of an irritant compound such as methacrylic acid. 1 cubic centimeter or more of irritant compound per square meter of the cover has been found to be sufficient to drive the bees from the super. The cover containing the irritant compound is then placed over the honey super 16 as illustrated in FIGURE 1. The irritant compound vaporizes and the irritating vapors slowly diffuse into the honey super 16. Depending upon the condition of the hive and the ambient temperature, substantially all of the bees will be driven from the honey supers within a period of about 30 seconds to about 5 minutes, after which time the cover 18 may be removed from the hive and the honey super may be removed and replaced by an empty super.

It can be seen that a method for repelling bees has been described which provides for the orderly and efficient removal of bees from within the honey supers of a bee hive. Further, a cover for a bee hive has been described which provides for a positive engagement with the walls of the super, and which provides a convenient means for introducing irritating vapors into the hive.

Various of the features of the invention are set forth in the following claims.

What is claimed is:

1. A method of removing bees from a beehive comprising, introducing into a beehive an effective amount of a member selected from the group consisting of furfural, salicylaldehyde, azeladehyde, benzoyl chloride and n-caproyl chloride.

2. A method of removing bees from a beehive comprising, introducing into a beehive an effective amount of a compound selected from the group consisting of pyruvic acid, n-butyric acid, isobutyric acid, trimethyl acetic acid, neopentanoic acid, valeric acid, isovaleric acid, methacrylic acid, n-benzyl methylamine, triisobutyl amine, butyric anhydride, valeric anhydride, isovaleric anhydride, furfural, salicylaldehyde, azelaldehyde, benzoyl chloride, n-caproyl chloride and isobutyric anhydride.

3. A method of removing bees from a beehive comprising introducing into a beehive an effective amount of n-butyric anhydride.

4. A method of removing bees from a beehive comprising introducing into a beehive an effective amount of isobutyric anhydride.

5. A method of removing bees from a beehive comprising introducing into a beehive an effective amount of butyric acid.

6. A method of removing bees from a beehive comprising introducing into a beehive an effective amount of isobutyric acid.

References Cited

UNITED STATES PATENTS

| 3,055,803 | 9/1962  | Goodhue et al. | 167—46 |
| 3,113,072 | 12/1963 | Goodhue et al. | 167—46 |
| 1,523,318 | 1/1925  | Utton          | 6—1    |
| 2,530,801 | 11/1950 | Babcock        | 6—1    |
| 2,548,275 | 4/1951  | Watkins        | 6—1    |
| 3,122,473 | 2/1964  | White et al.   | 167—22 |

FOREIGN PATENTS 517,548  10/1955  Canada.

OTHER REFERENCES

King: Agriculture Handbook No. 69, U.S. Dept. of Agriculture, May 1954, pp. 13–16, 84 and 124.

ALBERT T. MEYERS, Primary Examiner

J. GOLDBERG, Assistant Examiner

U.S. Cl. X.R.

424—230, 285, 317, 325, 330, 333